(12) United States Patent
Jang et al.

(10) Patent No.: US 11,557,818 B2
(45) Date of Patent: Jan. 17, 2023

(54) BATTERY PACK (71) Applicant: Samsung SDI Co., Ltd., Yongin-si (KR)

(72) Inventors: Jinsung Jang, Yongin-si (KR); Hanho Kim, Yongin-si (KR); Heonhee Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 127 days.

(21) Appl. No.: 17/041,426

(22) PCT Filed: Apr. 12, 2019

(86) PCT No.: PCT/KR2019/004403
§ 371 (c)(1),
(2) Date: Sep. 24, 2020

(87) PCT Pub. No.: WO2019/221394
PCT Pub. Date: Nov. 21, 2019

(65) Prior Publication Data
US 2021/0020896 A1 Jan. 21, 2021

(30) Foreign Application Priority Data
May 15, 2018 (KR) .......................... 10-2018-0055656

(51) Int. Cl.
*H01M 10/6567* (2014.01)
*H01M 50/543* (2021.01)
(Continued)

(52) U.S. Cl.
CPC ..... *H01M 50/543* (2021.01); *H01M 10/6567* (2015.04); *H01M 10/613* (2015.04);
(Continued)

(58) Field of Classification Search
CPC ........... H01M 10/613; H01M 10/6556; H01M 10/6567; H01M 10/6568; H01M 50/209; H01M 50/543; Y02E 60/10
See application file for complete search history.

(56) References Cited

U.S. PATENT DOCUMENTS 9,385,404 B2   7/2016  Yoon et al.
9,673,490 B2   6/2017  Kim et al.
(Continued)

FOREIGN PATENT DOCUMENTS

EP   1 143 541 A1   10/2001
EP   2 530 778 A1   12/2012
(Continued)

OTHER PUBLICATIONS

International Search Report for corresponding International Application No. PCT/KR2019/004403, dated Jul. 22, 2019, 2pp.
(Continued)

*Primary Examiner* — Lingwen R Zeng
(74) *Attorney, Agent, or Firm* — Lewis Roca Rothgerber Christie LLP (57) ABSTRACT

A battery pack includes: a battery cell including a terminal surface on which an electrode terminal is located, a bottom surface opposite the terminal surface, and a lateral surface between the terminal surface and the bottom surface; a first tank facing the terminal surface of the battery cell; a second tank extending from the first tank and facing the lateral surface of the battery cell; and a third tank extending from the second tank and facing the bottom surface of the battery cell, and a cavity is defined in the first and second tanks to extend across the first and second tanks, the cavity being filled with a first cooling medium and being fluidically isolated from an outside of the battery pack; and a flow path is defined in the third tank to receive a flow of a second (Continued)

cooling medium which is different from the first cooling medium.

19 Claims, 5 Drawing Sheets

(51) Int. Cl.
   *H01M 10/6568* (2014.01)
   *H01M 10/613* (2014.01)
   *H01M 50/209* (2021.01)
   *H01M 10/6556* (2014.01)

(52) U.S. Cl.
   CPC .... *H01M 10/6556* (2015.04); *H01M 10/6568* (2015.04); *H01M 50/209* (2021.01); *Y02E 60/10* (2013.01)

(56) References Cited

U.S. PATENT DOCUMENTS

| | | |
|---|---|---|
| 2004/0201366 A1 | 10/2004 | Kimoto et al. |
| 2011/0305935 A1 | 12/2011 | Yoon |
| 2012/0021260 A1 | 1/2012 | Yasui et al. |
| 2013/0149583 A1 | 6/2013 | Kurita |
| 2015/0207115 A1* | 7/2015 | Wondraczek ..... H01M 10/6567 429/99 |
| 2015/0295286 A1 | 10/2015 | Ahn et al. |
| 2017/0229747 A1* | 8/2017 | Jung ................... H01M 10/613 |
| 2018/0034021 A1 | 2/2018 | Yamamoto et al. |
| 2018/0123159 A1 | 5/2018 | Kim |
| 2020/0321666 A1 | 10/2020 | Kim |

FOREIGN PATENT DOCUMENTS

| | | |
|---|---|---|
| JP | 2009-170259 A | 7/2009 |
| JP | 2012-104339 A | 5/2012 |
| JP | 5354846 B2 | 11/2013 |
| KR | 10-2009-0047927 A | 5/2009 |
| KR | 10-1084224 B1 | 11/2011 |
| KR | 10-2012-0069567 A | 6/2012 |
| KR | 10-2014-0058730 A | 5/2014 |
| KR | 10-2015-0118831 A | 10/2015 |
| KR | 10-1658517 B1 | 9/2016 |
| KR | 10-1690575 B1 | 12/2016 |
| KR | 10-2018-0048030 A | 5/2018 |
| WO | WO 2017/204458 A1 | 11/2017 |

OTHER PUBLICATIONS

Extended European Search Report dated Jan. 25, 2022 issued in EP Application No. 19803849.9, 5 pages.

* cited by examiner

BATTERY PACK

CROSS-REFERENCE TO RELATED APPLICATIONS

This application is a National Phase Patent Application of International Patent Application Number PCT/KR2019/004403, filed on Apr. 12, 2019, which claims priority to Korean Patent Application No. 10-2018-0055656, filed May 15, 2018, the entire contents of both of which are incorporated herein by reference.

FIELD

Aspects of embodiments of the present disclosure relate to a battery pack.

BACKGROUND

In general, secondary batteries refer to batteries that can be repeatedly charged and recharged, unlike non-rechargeable primary batteries. Secondary batteries are used as energy sources of devices, such as mobile devices, electric vehicles, hybrid vehicles, electric bicycles, or uninterruptible power supplies. Secondary batteries may be individually used, or secondary battery modules (battery packs) each including a plurality of secondary batteries connected as one unit may be used according to the types of external devices using the secondary batteries.

Unlike small mobile devices, such as cellular phones, each operable for a certain period of time using a single battery, devices such as electric vehicles or hybrid vehicles having long operation times and consuming large amounts of electricity may preferably use battery modules (battery packs) each including a plurality of batteries to handle problems relating to power and capacity, and the output voltages or currents of battery modules may be increased by adjusting the number of batteries included in each battery module.

SUMMARY

According to an aspect of embodiments of the present disclosure, a battery pack having improved heat dissipation efficiency by using a liquid cooling medium contained to face different surfaces of the battery pack is provided.

According to another aspect of embodiments of the present disclosure, a battery pack configured to realize high heat dissipation efficiency with relatively low costs through a simple high-efficiency heat dissipation structure is provided.

A battery pack according to one or more embodiments of the present disclosure includes: a battery cell including a terminal surface on which an electrode terminal is located, a bottom surface which is opposite the terminal surface, and a lateral surface which is between the terminal surface and the bottom surface; a first tank which faces the terminal surface of the battery cell; a second tank which extends from the first tank and faces the lateral surface of the battery cell; and a third tank which extends from the second tank and faces the bottom surface of the battery cell, wherein a cavity is defined in the first and second tanks to extend across the first and second tanks, and the cavity is filled with a first cooling medium and is fluidically isolated from an outside of the battery pack, and a flow path is defined in the third tank to receive a flow of a second cooling medium which is different from the first cooling medium.

According to an aspect of embodiments of the present disclosure, battery cell cooling efficiency may be improved by using cooling media which are contained in first to third tanks to face different surfaces of battery cells, and realizing a fluid cooling system with a cooling medium having a relatively high heat capacity.

According to an aspect of embodiments of the present disclosure, since a cooling medium contained in the first and second tanks relatively close to electrode terminals are allowed to naturally convect at a relatively low flow speed or dissipate heat in a static state in which the flow speed of the cooling medium is substantially zero, it may be unnecessary to provide a duct structure for introducing or discharging the cooling medium or a fluid pump for forcing the cooling medium to circulate. Therefore, heat dissipation efficiency may be improved using the cooling medium having a relatively high heat capacity while decreasing the possibility of a short circuit at the electrode terminals caused by leakage or accumulation of the cooling medium, and high heat dissipation efficiency may be realized with low costs due to simplification in structure.

DETAILED DESCRIPTION

A battery pack according to one or more embodiments of the present disclosure includes: a battery cell including a terminal surface on which an electrode terminal is located, a bottom surface which is opposite the terminal surface, and a lateral surface which is between the terminal surface and the bottom surface; a first tank which faces the terminal surface of the battery cell; a second tank which extends from the first tank and faces the lateral surface of the battery cell; and a third tank which extends from the second tank and faces the bottom surface of the battery cell, wherein a cavity is defined in the first and second tanks to extend across the first and second tanks, and the cavity is filled with a first cooling medium and is fluidically isolated from outside of the battery pack, and a flow path is defined in the third tank to receive a flow of a second cooling medium which is different from the first cooling medium.

For example, the cavity may extend through a boundary region between the first and second tanks to allow a fluid to flow between the first and second tanks.

For example, the cavity of the first and second tanks and the flow path of the third tank may be isolated from each other.

For example, the battery pack may further include a heat conduction block between the cavity of the first and second tanks and the flow path of the third tank.

For example, the heat conduction block may not be provided with a space for storing a fluid.

For example, an inlet for introducing the second cooling medium and an outlet for discharging the second cooling medium may be formed in the third tank.

For example, an average flow speed of the first cooling medium may be less than an average flow speed of the second cooling medium.

For example, the first cooling medium may have a heat capacity greater than a heat capacity of the second cooling medium.

For example, the first and second tanks may be connected to each other through a first bent portion and may extend in different directions from the first bent portion to respectively face the terminal surface and the lateral surface of the battery cell.

For example, the cavity may extend through the first bent portion and may fluidically connect the first and second tanks to each other.

For example, the second and third tanks may be connected to each other through a second bent portion and may extend in different directions from the second bent portion to respectively face the lateral surface and the bottom surface of the battery cell.

For example, the battery pack may further include a heat conduction block between the cavity of the second tank and the flow path of the third tank, and the heat conduction block may include the second bent portion and may extend across the second bent portion.

For example, the first tank may be located in a region outside a pair of electrode terminals.

For example, the cavity may have a width which is uniform in the first tank and is nonuniform in the second tank.

For example, the width of the cavity may gradually decrease from an upper position of the second tank which is relatively close to the first tank toward a lower position of the second tank which is relatively close to the third tank.

For example, the second tank may include an inner wall facing the lateral surface of the battery cell, and an outer wall which is opposite the lateral surface of the battery cell, and a thickness of the second tank which is defined between the inner wall and the outer wall may be constant from the upper position relatively close to the first tank to the lower position relatively close to the third tank.

For example, a first thickness defined between the cavity and the inner wall may be constant from the upper position relatively close to the first tank to the lower position relatively close to the third tank, and a second thickness defined between the cavity and the outer wall may gradually increase from the upper position relatively close to the first tank to the lower position relatively close to the third tank.

For example, the cavity of the second tank may have a triangular cross-section with a hypotenuse which obliquely extends from a vertex located at the upper position relatively close to the first tank to a vertex located at the lower position relatively close to the third tank such that the width of the cavity may gradually decrease from the upper position to the lower position.

For example, the first to third tanks may extend as one part.

Herein, a battery pack will be described according to some example embodiments of the present disclosure with reference to the accompanying drawings.

Figure 1:
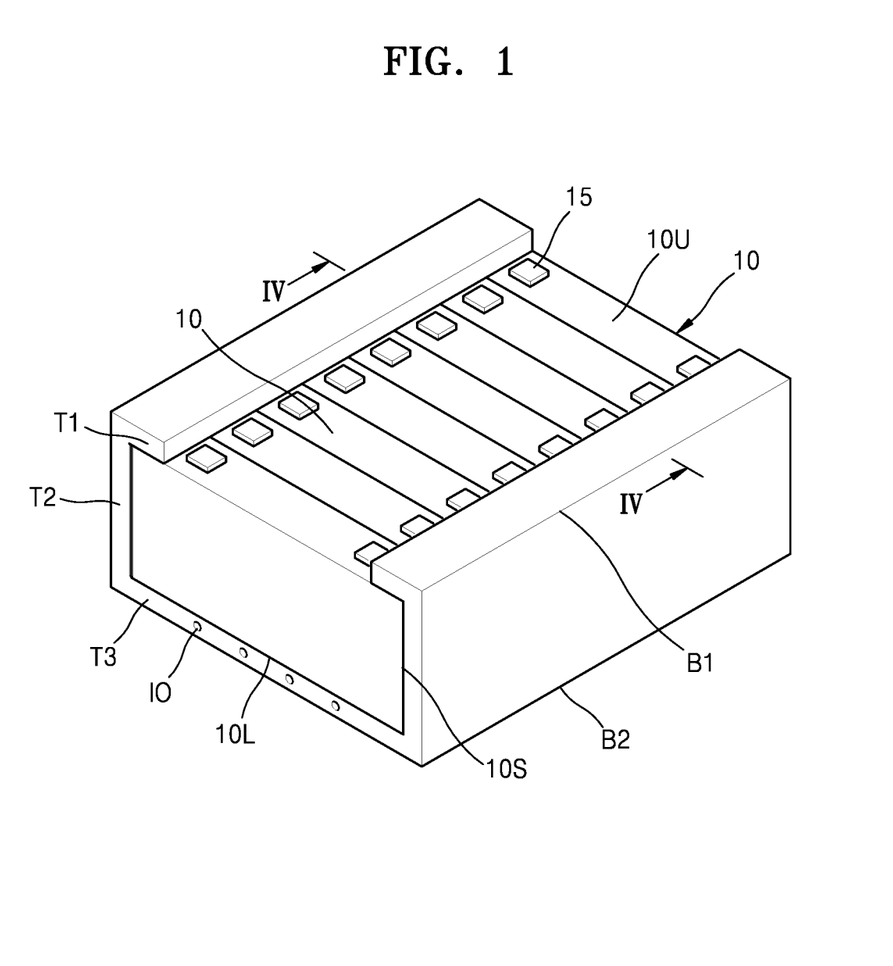
FIG. 1 is a perspective view illustrating a battery pack according to an embodiment of the present disclosure.
Figure 2:
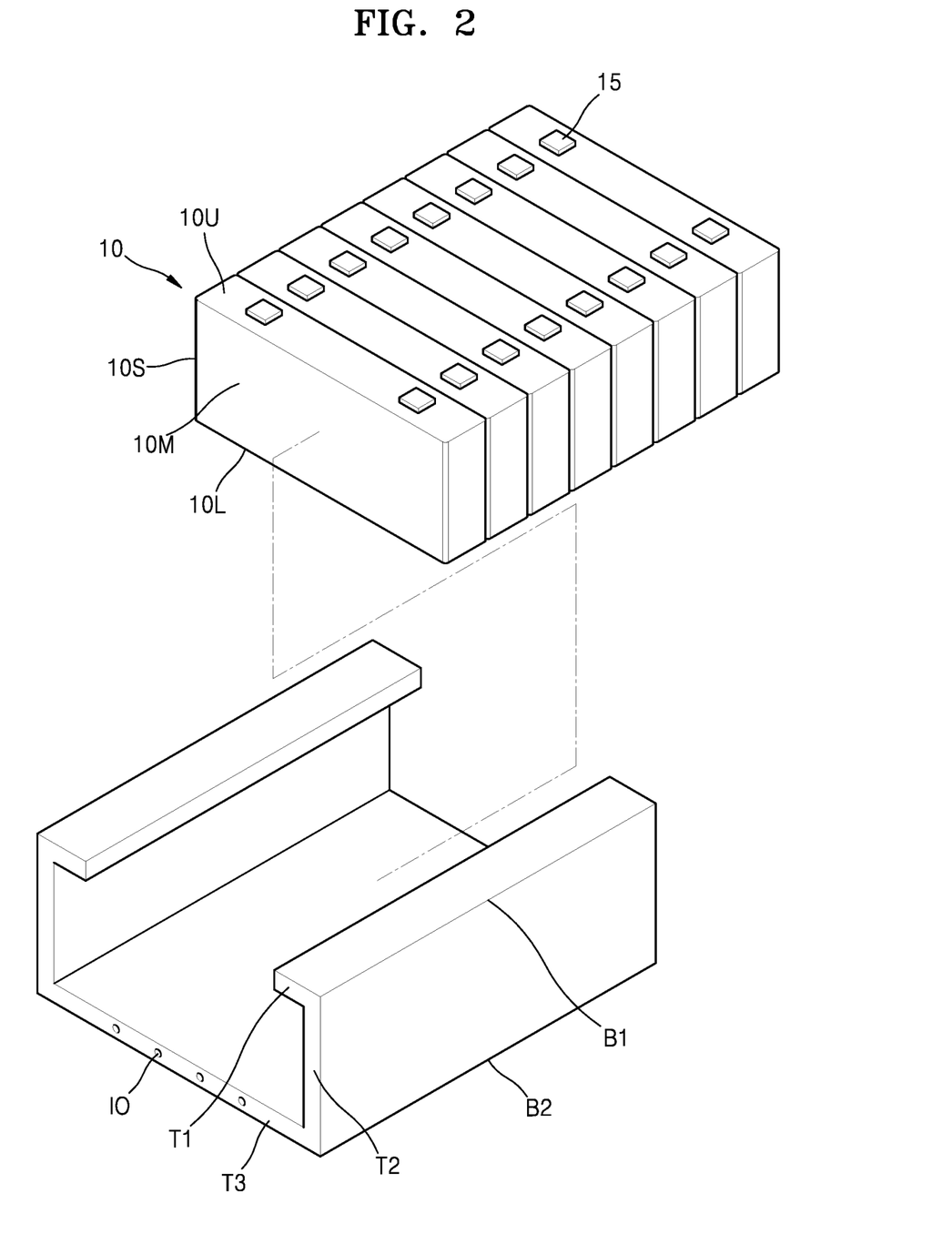
FIG. 2 is an exploded perspective view illustrating the battery pack illustrated in FIG. 1.
Figure 3:
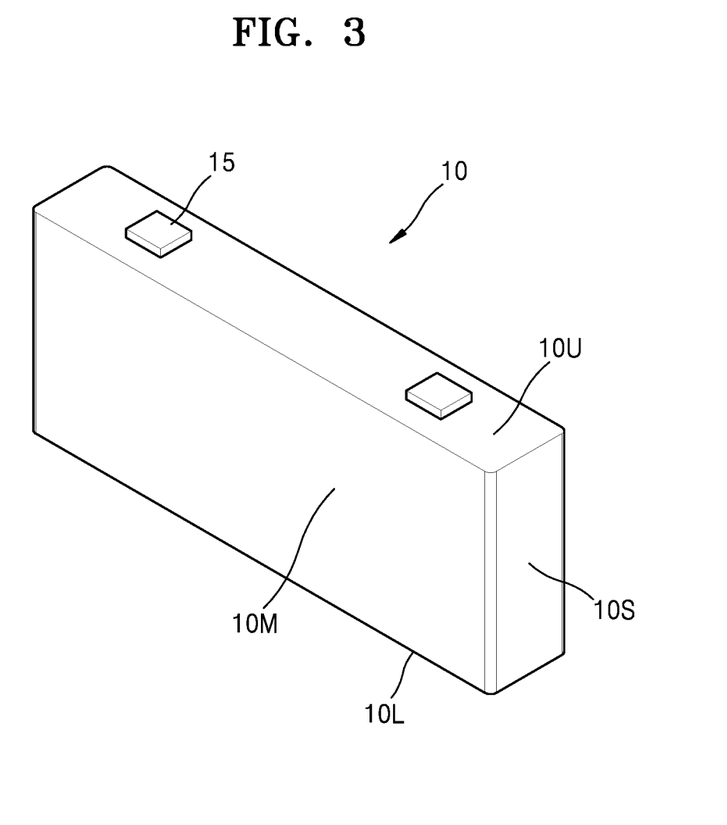
FIG. 3 is a perspective view illustrating a battery cell illustrated in FIG. 1.
Figure 4:
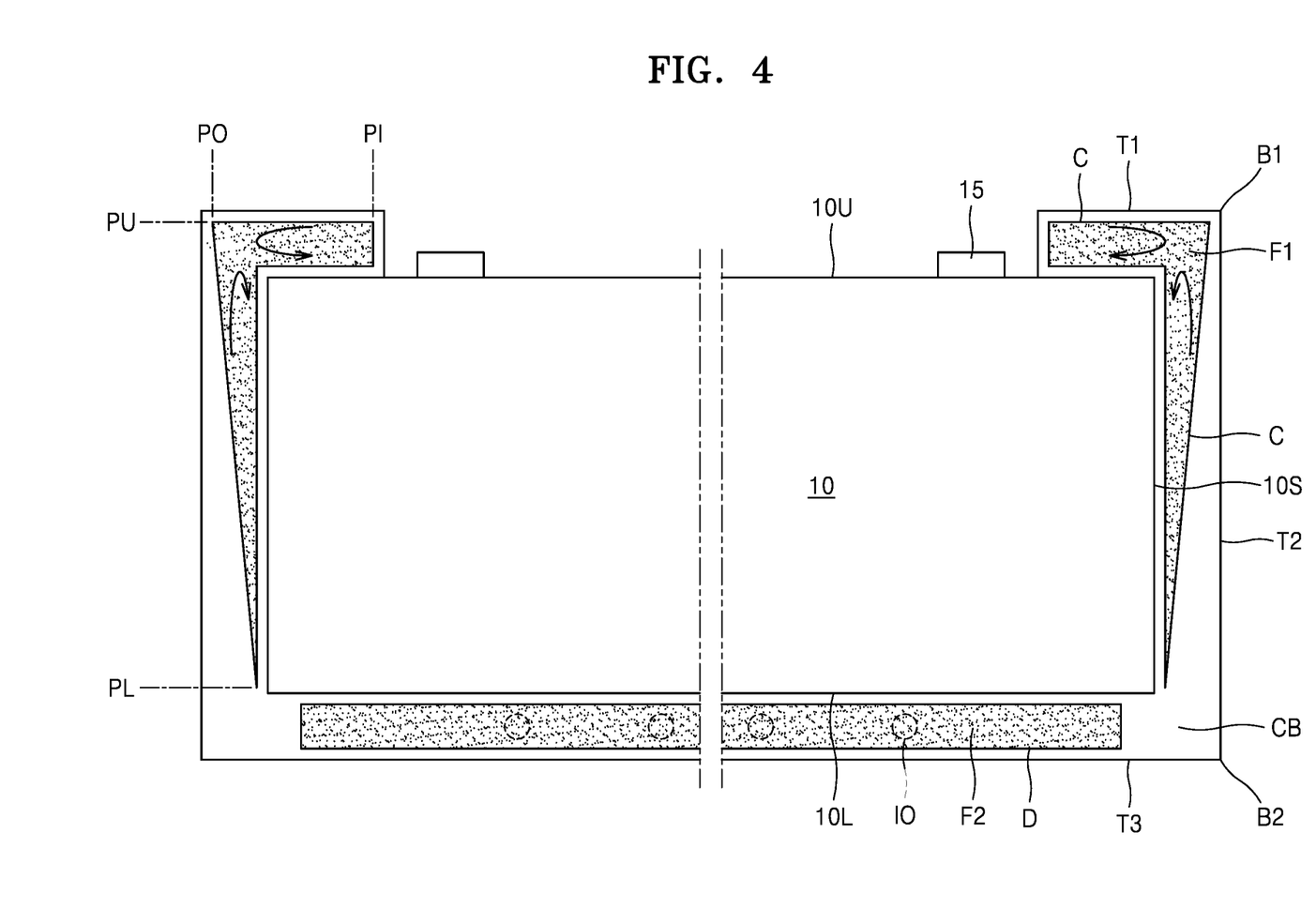
FIG. 4 is a cross-sectional view taken along the line IV-IV of FIG. 1.
Figure 5:
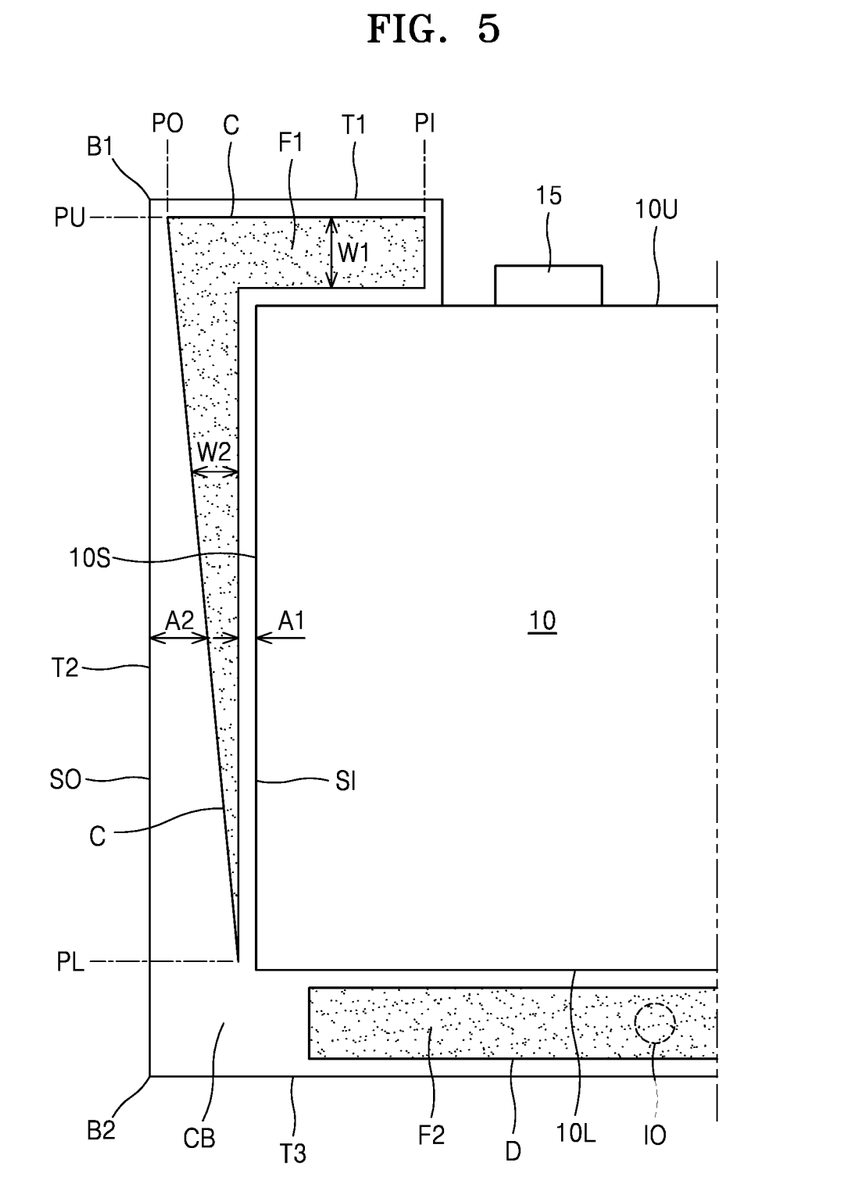
FIG. 5 is an enlarged view illustrating a region of FIG. 4.

FIG. 1 is a perspective view illustrating a battery pack according to an embodiment of the present disclosure; FIG. 2 is an exploded perspective view illustrating the battery pack shown in FIG. 1; FIG. 3 is a perspective view illustrating a battery cell illustrated in FIG. 1; FIG. 4 is a cross-sectional view taken along the line IV-IV of FIG. 1; and FIG. 5 is an enlarged view illustrating a region of FIG. 4.

Referring to the drawings, the battery pack may include: a plurality of battery cells 10; and first, second, and third tanks T1, T2, and T3 around (e.g., surrounding) the battery cells 10. The first, second, and third tanks T1, T2, and T3 may be arranged around the battery cells 10 and may dissipate heat from the battery cells 10 at different positions around the battery cells 10, and to dissipate heat from the battery cells 10, the first, second, and third tanks T1, T2, and T3 may accommodate cooling media having high heat capacities. As described later, the first, second, and third tanks T1, T2, and T3 may dissipate heat from the battery cells 10 by a liquid cooling method using first and second cooling media F1 and F2 which have relatively high heat capacities instead of using gases such as air.

In an embodiment, the first, second, and third tanks T1, T2, and T3 may be formed in one piece to have a continuous structure. For example, the first, second, and third tanks T1, T2, and T3 may be formed as one part through, for example, a process such as a high-pressure die casting process instead of forming the first, second, and third tanks T1, T2, and T3 as individual parts and then combining the first, second, and third tanks T1, T2, and T3 with each other.

In an embodiment, each pair of the first and second tanks T1 and T2 may share one cavity C (refer to FIG. 4) that is continuously formed, and to prevent or substantially prevent leakage of the first cooling medium F1 (refer to FIG. 4) filled in the cavity C (refer to FIG. 4), each pair of the first and second tanks T1 and T2 may be formed as one part to maintain the fluid tightness of the cavity C (refer to FIG. 4). Since the first and second tanks T1 and T2 are positioned relatively close to electrode terminals 15 at which charge-discharge current is concentrated, it is desired to tightly seal the first cooling medium F1 (refer to FIG. 4) to prevent or substantially prevent a short circuit caused by leakage of the first cooling medium F1 (refer to FIG. 4), and, thus, at least the first and second tanks T1 and T2 may be continuously connected to each other in a seamless form without any joints therebetween.

The first and second tanks T1 and T2 may be connected to each other with first bent portions B1 as boundaries therebetween, and may extend in different directions from the first bent portions B1 to face different surfaces of the battery cells 10. Similarly, the second and third tanks T2 and T3 may be connected to each other with second bent portions B2 as boundaries therebetween, and may extend in different directions from the second bent portions B2 to face different surfaces of the battery cells 10.

Referring to FIG. 3, in an embodiment, each of the battery cells 10 may include: a terminal surface 10U on which electrode terminals 15 are formed; a bottom surface 10L which is opposite the terminal surface 10U; main surfaces 10M which extend between the terminal surface 10U and the bottom surface 10L and having a relatively large area; and lateral surfaces 10S which extend between the terminal surface 10U and the bottom surface 10L and having a relatively small area.

In an embodiment, each of the battery cells 10 may be formed in a substantially rectangular parallelepiped shape including the terminal surface 10U, the bottom surface 10L, a pair of the main surfaces 10M, and a pair of the lateral surfaces 10S. The battery cells 10 may be arranged in one direction, and, in this case, the main surfaces 10M of neighboring battery cells 10 may face each other.

The first, second, and third tanks T1, T2, and T3 may be around (e.g., surrounding) the terminal surfaces 10U, the bottom surfaces 10L, and the lateral surfaces 10S between the terminal surfaces 10U and the bottom surfaces 10L, that is, may be around (e.g., surrounding) four different surfaces 10U, 10S, and 10L except the main surfaces 10M which face each other in the arrangement direction of the battery cells 10.

In an embodiment, the first, second, and third tanks T1, T2, and T3 may be formed in one piece, and, since the first, second, and third tanks T1, T2, and T3 around (e.g., surrounding) the four different surfaces 10U, 10S, and 10L of the battery cells 10 are formed in one piece, structures for joining individual members may not be required, thereby providing simplicity in structure.

The assembly of the battery pack will be described further below with reference to FIG. 2. That is, the first, second, and third tanks T1, T2, and T3 formed in one piece around (e.g., to surround) the four different surfaces 10U, 10S, 10L except the main surfaces 10M which face each other in the arrangement direction of the battery cells 10 may first be prepared; the battery cells 10 may be assembled by sliding the battery cells 10 in one direction (corresponding to the arrangement direction) into the first, second, and third tanks T1, T2, and T3 that are open in the direction (corresponding to the arrangement direction); and a pair of end plates (not shown) may be placed on one open end and the other open end of the first, second, and third tanks T1, T2, and T3 in the direction (corresponding to the arrangement direction) as a finishing member for the open ends of the first, second, and third tanks T1, T2, and T3.

Referring to FIGS. 4 and 5, the first tanks T1 may be arranged to face the terminal surfaces 10U of the battery cells 10. Since charge-discharge current is concentrated on the terminal surfaces 10U of the battery cells 10, and the electrode terminals 15 connected to electrode assemblies (not shown) provided inside the battery cells 10 are formed on the terminal surfaces 10U, the generation of heat may be concentrated on the terminal surfaces 10U of the battery cells 10, and, thus, it may be desired to dissipate heat mainly from the terminal surfaces 10U of the battery cells 10. The first tanks T1 may be arranged to face the terminal surfaces 10U of the battery cells 10 and dissipate heat from the terminal surfaces 10U of the battery cells 10 at a close distance.

A pair of electrode terminals 15 facing each other may be formed on the terminal surface 10U of each of the battery cells 10, and the first tanks T1 may be arranged outside the pair of electrode terminals 15. For example, the first tanks T1 may not entirely cover the terminal surface 10U of each of the battery cells 10, but may cover a portion of the terminal surface 10U, that is, only outer regions of the terminal surface 10U. Since the first tanks T1 selectively cover the outer regions of the terminal surface 10U as described above, the pair of electrode terminals 15 may be exposed from the first tanks T1 in an inner region of the terminal surface 10U, and bus bars (not shown) may be coupled to the exposed electrode terminals 15 to electrically connect the electrode terminals 15 with electrode terminals 15 of adjacent battery cells 10.

The first tanks T1 may extend from inner positions PI relatively adjacent to the electrode terminals 15 to outer positions PO relatively distant from the electrode terminals 15, and, in an embodiment, the cavities of the first tanks T1 may have a uniform width W1 (refer to FIG. 5) from the inner positions PI to the outer positions PO. In this case, the width W1 of the cavities C of the first tanks T1 may be measured in a direction perpendicular to the terminal surface 10U of each of the battery cells 10 which faces the first tanks T1.

In an embodiment, since the first tanks T1 are arranged to face the terminal surfaces 10U for dissipation of a relatively large amount of heat and have relatively small lengths within the outer regions of the battery cells 10 so as not to cover the electrode terminals 15, the first cooling medium F1 is contained in the cavities C in a sufficient amount for providing desired heat dissipation, and the cavities C of the first tanks T1 may have a uniform width W1 from the inner positions PI close to the electrode terminals 15 to the outer positions PO distant from the electrode terminals 15. When the cavities C of the first tanks T1 have a nonuniform width W1, heat may be poorly dissipated in a region in which the width W1 is relatively small because of an insufficient amount of the first cooling medium F1.

The first tanks T1 provide for dissipation of heat from the terminal surfaces 10U of the battery cells 10 at positions close to the terminal surfaces 10U of the battery cells 10. As described later, the first, second, and third tanks T1, T2, and T3 are thermally connected to each other and cooperate with each other for dissipating heat from the battery cells 10, and heat of the terminal surfaces 10U may be transferred to the second and third tanks T2 and T3 through the first tanks T1 closest to the terminal surfaces 10U and may then be finally dissipated to the outside of the battery pack through the third tank T3.

The second tanks T2 may be arranged to face the lateral surfaces 10S of the battery cells 10. The second tanks T2 may extend through the first bent portions B1 from the first tanks T1 facing the terminal surfaces 10U of the battery cells 10 to face the lateral surfaces 10S of the battery cells 10. The second tanks T2 may be arranged to face the lateral surfaces 10S of the battery cells 10 and may dissipate heat from the lateral surfaces 10S of the battery cells 10 at a close distance from the lateral surfaces 10S of the battery cells 10.

In an embodiment, each of the second tanks T2 may share one cavity C with one first tank T1, and the cavities C may extend across the first and second tanks T1 and T2 to fluidically connect the first and second tanks T1 and T2 to each other. For example, the cavities C may extend through the first bent portions B1 forming boundary regions between the first and second tanks T1 and T2 to fluidically connect the first and second tanks T1 and T2 to each other and thus to allow a fluid to flow between the first and second tanks T1 and T2. In the present specification, the expression "the cavities C extend across the first and second tanks T1 and T2," or "the cavities C extend through the first and second tanks T1 and T2" may mean that the cavities C fluidically connect the first and second tanks T1 and T2 through the boundaries between the first and second tanks T1 and T2.

The first cooling medium F1 filled in the cavities C may allow direct heat transfer between the first and second tanks T1 and T2 while moving in the cavities C by natural convection. For example, since the first and second tanks T1 and T2 are fluidically connected to each other, natural convection in the first tanks T1 and natural convection in the second tanks T2 may affect each other, and this may mean that: natural convection in the first tanks T1 and natural convection in the second tanks T2 may come into direct contact with each other or mix with each other to result in heat exchange; or heat transfer may occur between the first and second tanks T1 and T2 by natural convection of the first cooling medium F1 filled in the cavities C extending through the first and second tanks T1 and T2.

Since the first tanks T1 face the terminal surfaces 10U on which heat is concentrated, the first tanks T1 may absorb heat from the terminal surfaces 10U at a close distance from the terminal surfaces 10U, and the first cooling medium F1 which has absorbed heat from the terminal surfaces 10U may transfer the heat to the second tanks T2 by natural convection. The first and second tanks T1 and T2 may be connected to each other through the first bent portions B1 and may extend in different directions from the first bent portions B1 to respectively face the terminal surfaces 10U and the lateral surfaces 10S of the battery cells 10. In this case, the cavities C of the first and second tanks T1 and T2 may penetrate the first bent portions B1 to fluidically connect the first and second tanks T1 and T2 to each other.

Natural convection may occur due to thermal imbalance between the first and second tanks T1 and T2, and, for example, natural convection in the first tank T1 and natural convection in the second tank T2 may occur in opposite directions such as clockwise and counterclockwise circulations and may meet and mix with each other at the first bent portions B1. For example, in the cavities C extending through the first and second tanks T1 and T2, one flow may be formed by natural convection, or circulations may be formed in opposite directions by natural convection and may meet and mix with each other at the first bent portions B1.

The cavities C extending through the first and second tanks T1 and T2 are filled with the first cooling medium F1, and thermal imbalance may occur in the cavities C according to the distances from the electrode terminals 15 at which heat is intensively generated such that the first cooling medium F1 may directly transfer heat by natural convection. For example, heat may transfer between the first and second tanks T1 and T2 by natural convection in the cavities C extending through the first and second tanks T1 and T2. That is, heat may transfer from the first tanks T1 to the second tanks T2, and, thus, heat may transfer from the terminal surfaces 10U through the first and second tanks T1 and T2 to the third tank T3 which is thermally connected to the second tanks T2 such that the heat may be finally dissipated to the outside of the battery pack through the third tank T3.

The second tanks T2 may extend from upper positions PU close to the first tanks T1 to lower positions PL close to the third tank T3. In an embodiment, the cavities C of the second tanks T2 may have a width W2 (refer to FIG. 5) that gradually decreases from the upper positions PU to the lower positions PL. Here, the width W2 of the cavities C of the second tanks T2 may be measured in a direction perpendicular to the lateral surfaces 10S of the battery cells 10 facing the second tanks T2.

The second tanks T2 may be arranged to face the lateral surfaces 10S of the battery cells 10, and may have inner walls SI facing the battery cells 10 and outer walls SO which are opposite the battery cells 10, wherein the width between the inner walls SI and the outer walls SO of the second tanks T2 may be uniform from the upper positions PU to the lower positions PL. Here, the width of the second tanks T2 may be measured in a direction perpendicular to the lateral surfaces 10S of the battery cells 10 facing the second tanks T2.

In an embodiment, the second tanks T2 may have a uniform width from the upper positions PU to the lower positions PL, and the cavities C formed in the second tanks T2 may have a width W2 which gradually decreases in a direction from the upper positions PU to the lower positions PL. In an embodiment, this structure may be formed by adjusting a first thickness A1 (refer to FIG. 5) between the inner walls SI and the cavities C of the second tanks T2 to be uniformly thin to bring the cavities C of the second tanks T2 as close as possible to the battery cells 10 (more specifically, the lateral surfaces 10S of the battery cells 10), and adjusting a second thickness A2 (refer to FIG. 5) between the outer walls SO and the cavities C of the second tanks T2 to gradually increase from the upper positions PU to the lower positions PL for varying the width W2 of the cavities C in the direction from the upper positions PU to the lower positions PL.

For example, the cavity C of each of the second tanks T2 may have a right-angled triangular cross-section, and as the hypotenuse of the right-angled triangular cross-section obliquely extends in a direction from a vertex located at the upper position PU to a vertex located at the lower positions PL, the width W2 of the cavity C may gradually decrease. The first cooling medium F1 may be filled in the cavities C, and, since the width W2 of the cavities C may be designed to be different at the upper positions PU and the lower positions PL, the volume of the first cooling medium F1 filled in the cavies C may be differentially changed. That is, for example, the volume of the first cooling medium F1 may change from a maximum value to a minimum value in a direction from the upper positions PU to the lower positions PL, and, in this manner, the volume of the first cooling medium F1 may be differentially designed according to the amounts of heat to be dissipated at different positions.

Heat may be relatively intensively generated in the electrode terminals 15 of the battery cells 10 in which charge-discharge currents is concentrated. By considering this, heat may be differentially dissipated from the upper positions PU close to the electrode terminals 15 by adjusting the width W2 of the cavities C of the second tanks T2 to be relatively great at the upper positions PU. That is, the upper positions PU at which the need for heat dissipation is relatively great may face a relatively great width W2 of the cavities C and may thus face the maximum volume of the first cooling medium F1. In addition, the lower positions PL at which the need for heat dissipation is relatively low may face a relatively small width W2 of the cavities C and may thus face the minimum volume of the first cooling medium F1.

In an embodiment, the cavities C may extend through the first and second tanks T1 and T2 and may have different shapes in the first and second tanks T1 and T2. In an embodiment, the cavities C of the first tanks T1 may have a uniform width W1 from the inner positions PI relatively close to the electrode terminals 15 to the outer positions PO relatively distant from the electrode terminals 15, and the cavities of the first tanks T1 facing the terminal surfaces 10U may have a uniform width W1 such that the first cooling medium F1 may be provided in a sufficient amount for the terminal surfaces 10U having a relatively high heat dissipation demand. When the cavities C of the first tanks T1 have a nonuniform width W1, since the first tanks T1 have a relatively small length covering outer regions of the terminal surfaces 10U, the amount of the first cooling medium F1 may be insufficient at some positions to result in poor heat dissipation. Thus, in an embodiment, the cavities C of the first tanks T1 may be formed to have a uniform width W1.

In an embodiment, the width W2 of the cavities C of the second tanks T2 may be relatively great at the upper positions PU at which the heat dissipation demand is concentrated and may be relatively small at the lower positions PL at which the heat dissipation demand is relatively low, and, thus, the volume of the first cooling medium F1 may be differentially designed according to the width W2 of the cavities C which varies from the upper positions PU to the lower positions PL for efficient distribution of the first cooling medium F1 in accordance with the heat dissipation demand.

In an embodiment, the cavities C extending through the first and second tanks T1 and T2 are fluidically isolated, and the first cooling medium F1 is filled in the cavities C. The expression "the cavities C are fluidically isolated" may mean that each of the cavities C is not provided with a structure such as a duct for allowing the introduction and discharge of a fluid. That is, the cavities C may be fluidically isolated, and the first cooling medium F1 may be statically filled in the cavities C without any flow of the first cooling medium F1 into or out of the cavities C. The cavities C extending through the first and second tanks T1 and T2 may be fluidically isolated from the surrounding environment without fluidic connection with the surrounding environment, that is, without any flow of a fluid into or out of the cavities C.

The expression "the cavities C of the first and second tanks T1 and T2 are fluidically isolated" does not mean that the first and second tanks T1 and T2 are thermally insulated from the surrounding environment, and, as described later, the first and second tanks T1 and T2 are thermally connected to the third tank T3 such that the first and second tanks T1 and T2 may exchange heat with the third tank T3 through heat conduction blocks CB. In an embodiment, for example, the first and second tanks T1 and T2 are not fluidically connected to the third tank T3, and, thus, direct convection for heat transfer does not occur therebetween. However, since the first and second tanks T1 and T2 are thermally connected to the third tank T3 through the heat conduction blocks CB, heat transfer may occur therebetween by conduction. As described later, since the heat conduction blocks CB are provided between the first cooling medium F1 of the first and second tanks T1 and T2 and the second cooling medium F2 of the third tank T3, heat transfer may occur between the first and second cooling media F1 and F2, and heat transferred from the first cooling medium F1 may be dissipated to the outside of the battery pack through the second cooling medium F2 by convection forced by a fluid pump (not shown), for example.

Natural convection may occur in the cavities C due to thermal imbalance, and the first cooling medium F1 may naturally convect at a low flow speed or may absorb heat in a stationary state in which the flow speed of the first cooling medium F1 is almost zero. As described above, in the cavities C, the first cooling medium F1 naturally convects at a low flow speed or absorbs heat in a stationary state in which the flow speed of the first cooling medium F1 is almost zero, and, thus, in an embodiment, a fluid having a high heat capacity is used as the first cooling medium F1. As described later, the first cooling medium F1 of the first and second tanks T1 and T2 may be a fluid having a heat capacity greater than the heat capacity of the second cooling medium F2 of the third tank T3. This will be described in further detail later.

In an embodiment, the first cooling medium F1 does not flow into or out of the cavities C and is not forced to convect by a fluid pump, but is simply contained in the cavities C in a static state, such that it is not needed to provide the first and second tanks T1 and T2 with a duct structure for allowing the first cooling medium F1 to flow into or out of the cavities C, or a device such as a fluid pump for forcing the first cooling medium F1 to convect, and, thus, a simple fluid cooling structure may be provided using the first cooling medium F1.

Since the first and second tanks T1 and T2 in which the first cooling medium F1 is stored are arranged at positions closer to the electrode terminals 15 than the third tank T3 is to the electrode terminals 15, when the first and second tanks T1 and T2 adjacent to the electrode terminals 15 are provided with a structure such as a duct structure or a fluid pump, the possibility of leakage of the first cooling medium F1 stored in the first and second tanks T1 and T2 may increase. When the first cooling medium F1 leaks toward the electrode terminals 15 at which charge-discharge current is concentrated, the possibility of an accident, such as an electrical short circuit, may increase. Thus, in an embodiment of the present disclosure, fluid cooling is implemented using the first cooling medium F1 having a relatively high heat capacity to efficiently dissipate heat from the electrode terminals 15 having a relatively high heat dissipation demand, and the first and second tanks T1 and T2 storing the first cooling medium F1 are not provided with a duct for introduction or discharge of the first cooling medium F1 or a fluid pump for forcing the first cooling medium F1 to convect so as to prevent or substantially prevent leakage of the first cooling medium F1 to the electrode terminals 15, such that the first cooling medium F1 may dissipate heat from the electrode terminals 15 while the first cooling medium F1 naturally convects or absorbs heat at a low flow speed.

In an embodiment, the first cooling medium F1 may be a fluid which has a high heat capacity and is electrically insulative. The first cooling medium F1 is filled in the cavities C of the first and second tanks T1 and T2 which are close to the electrode terminals 15. In this case, in the process of injecting the first cooling medium F1 into the cavities C of the first and second tanks T1 and T2, the first cooling medium F1 may leak toward the electrode terminals 15, and when the first cooling medium F1 leaking toward the electrode terminals 15 accumulates on the terminal surfaces 10U, an electrical short circuit may occur between the electrode terminals 15 and other conductive members. Thus, in an embodiment, the first cooling medium F1 is electrically insulative. In an embodiment, for example, the first cooling medium F1 may be a fluid which is more electrically insulative than the second cooling medium F2 of the third tank T3 which is relatively distant from the electrode terminals 15, and, for example, the first cooling medium F1 may be a fluid having electrical conductivity lower than that of the second cooling medium F2.

The third tank T3 may be arranged to face the bottom surfaces 10L of the battery cells 10. The third tank T3 may extend through the second bent portions B2 from the second tanks T2 facing the lateral surfaces 10S of the battery cells 10 to face the bottom surfaces 10L of the battery cells 10. The third tank T3 may be arranged to face the bottom surfaces 10L of the battery cells 10 and may dissipate heat from the bottom surfaces 10L of the battery cells 10 at a close distance from the bottom surfaces 10L of the battery cells 10.

A flow path D for receiving the flow of the second cooling medium F2 different from the first cooling medium F1 may be formed in the third tank T3. In an embodiment, the flow path D of the third tank T3 is isolated from the cavities C extending through the first and second tanks T1 and T2 without fluidic connection with the cavities C. In an embodiment, the flow path D of the third tank T3 may contain a fluid different from a fluid contained in the cavities C of the first and second tanks T1 and T2, that is, the second cooling medium F2 different from the first cooling medium F1 of the first and second tanks T1 and T2, and the first and second cooling media F1 and F2 may be isolated from each other without being mixed with each other for dissipating heat from different regions of the battery pack. For example, the cavities C extending through the first and second tanks T1 and T2 may be fluidically isolated from the outside of the cavities C without fluidic connection with the third tank T3.

In an embodiment, the cavities C extending through the first and second tanks T1 and T2 is not fluidically connected to the flow path D of the third tank T3, but the first and second tanks T1 and T2 are thermally connected to the third tank T3 such that heat may transfer between the first cooling medium F1 of the first and second tanks T1 and T2 and the second cooling medium F2 of the third tank T3 through the heat conduction blocks CB. For example, the heat conduction blocks CB may be formed between the cavities C extending through the first and second tanks T1 and T2 and the flow path D of the third tank T3 as metal blocks having no fluid-containing space. For example, the heat conduction blocks CB may include solid portions of the second tanks T2 in which the cavities C are not formed, and solid portions of the third tank T3 in which the flow path D is not formed.

The heat conduction blocks CB may include the second bent portions B2 which connect the second and third tanks T2 and T3 to each other. The second bent portions B2 may connect the second and third tanks T2 and T3 to each other such that the second tanks T2 facing the lateral surfaces 10S of the battery cells 10 may be connected to the third tank T3 facing the bottom surfaces 10L of the battery cells 10 through the second bent portions B2, and the second and third tanks T2 and T3 may extend from the second bent portions B2 in different directions to respectively face the lateral surfaces 10S and the bottom surfaces 10L of the battery cells 10.

Heat transfer between the second and third tanks T2 and T3 occurs through the heat conduction blocks CB and is thus different from heat transfer between the first and second tanks T1 and T2 which occurs by natural convection. That is, in an embodiment, since the second and third tanks T2 and T3 are not fluidically connected to each other, convection heat transfer does not occur between the second and third tanks T2 and T3, but heat transfer occurs between the second and third tanks T2 and T3 through the heat conduction blocks CB which thermally connect the second and third tanks T2 and T3 to each other. That is, in an embodiment, the first cooling medium F1 of the second tank T2 and the second cooling medium F2 of the third tank T3 do not come into direct contact with each other or mix with each other, but heat transfer may occur between the first cooling medium F1 and the second cooling medium F2 by conduction through the heat conduction blocks CB.

In an embodiment, the third tank T3 may include the flow path D through which the second cooling medium F2 flows, and the second cooling medium F2 may be forced to flow at a certain flow speed by a fluid pump (not shown) such that heat transferred from the second tanks T2 or the bottom surfaces 10L of the battery cells 10 may be dissipated to the outside of the battery pack.

In an embodiment, the second cooling medium F2 is a fluid having a relatively high heat capacity for cooling efficiency. That is, in an embodiment, both the first cooling medium F1 of the first and second tanks T1 and T2 and the second cooling medium F2 of the third tank T3 are fluids having relatively high heat capacities. In an embodiment, since the first cooling medium F1 transfers heat while naturally convecting at a low flow speed in the cavities C of the first and second tanks T1 and T2 or absorbing heat in the cavities C of the first and second tanks T1 and T2 in a stationary state in which the flow speed of the first cooling medium F1 is almost zero, the first cooling medium F1 be a fluid having a relatively high heat capacity, and since the second cooling medium F2 is forced to flow at a controlled flow speed by the fluid pump, the flow speed of the second cooling medium F2 may be adjusted according to the heat dissipation demand such that the second cooling medium F2 may be a fluid having a heat capacity lower than that of the first cooling medium F1. For example, the average flow speed of the first cooling medium F1 may be less than the average flow speed of the second cooling medium F2, and the first cooling medium F1 may be a fluid having a heat capacity greater than that of the second cooling medium F2 to compensate for a cooling efficiency decrease caused by the flow speed difference.

Since the third tank T3 is arranged at a position more distant from the electrode terminals 15 than the first and second tanks T1 and T2 are from the electrode terminals 15, the possibility of leakage of the second cooling medium F2 to the electrode terminals 15 is relatively low. Therefore, the second cooling medium F2 may be a fluid less electrically insulative than the first cooling medium F1. That is, the second cooling medium F2 may be a fluid having relatively low heat capacity and electrical insulative characteristics compared to the first cooling medium F1. For example, the second cooling medium F2 may be a fluid such as water which is inexpensive compared to the first cooling medium F1.

The second cooling medium F2 may flow in the flow path D of the third tank T3, and the third tank T3 may include an inlet/outlet 10 for introducing the second cooling medium F2 having a low temperature or discharging the second cooling medium F2 having a high temperature. The second cooling medium F2 may circulate along a closed loop path including the flow path D of the third tank T3 or an open loop path including the flow path D of the third tank T3, and, in the closed loop path along which the second cooling medium F2 circulates, a cooling unit (not shown) may be provided to cool the second cooling medium F2.

In an embodiment, the first, second, and third tanks T1, T2, and T3 may be formed of a metallic material which has high thermal conductivity and high formability for forming spaces for storing fluids such as the cavities C or the flow path D in the first, second, and third tanks T1, T2, and T3. The first, second, and third tanks T1, T2, and T3 may be around (e.g., surround) four different surfaces 10U, 10S, and 10L of each of the battery cells 10, and may be formed of a metallic material having high heat conductivity for efficient heat transfer from the battery cells 10 to the first and second cooling media F1 and F2. For example, the first, second, and third tanks T1, T2, and T3 may be formed of an aluminum material.

In an embodiment, the first, second, and third tanks T1, T2, and T3 may be formed in one piece, and the second tanks T2 connected through the second bent portions B2 to the third tanks T3 facing the bottom surfaces 10L of the battery cells 10 may be provided as a pair facing each other and may face the lateral surfaces 10S of the battery cells 10. In addition, the first tanks T1 connected through the first bent portions B1 to the second tanks T2 facing the lateral surfaces 10S of the battery cells 10 may be provided as a pair and may face the terminal surfaces 10U of the battery cells 10.

While some example embodiments of the present disclosure have been described with reference to the accompanying drawings, the described embodiments are for illustrative purposes only, and it will be understood by those of ordinary skill in the art that various modifications and equivalent other embodiments may be made therefrom. Therefore, the scope and spirit of the present disclosure should be defined by the claims.

Embodiments of the present disclosure may be applied to battery packs which are rechargeable energy sources, and to various devices using battery packs as power sources.

The invention claimed is:

1. A battery pack comprising:
    a battery cell comprising a terminal surface on which an electrode terminal is located, a bottom surface which is opposite the terminal surface, and a lateral surface which is between the terminal surface and the bottom surface;
    a first tank which faces the terminal surface of the battery cell;
    a second tank which extends from the first tank and faces the lateral surface of the battery cell; and
    a third tank which extends from the second tank and faces the bottom surface of the battery cell,
    wherein a cavity is defined in the first and second tanks to extend across the first and second tanks, and the cavity is filled with a first cooling medium and is fluidically isolated from an outside of the battery pack, and
    a flow path is defined in the third tank to receive a flow of a second cooling medium which is different from the first cooling medium.

2. The battery pack of claim 1, wherein the cavity extends through a boundary region between the first and second tanks to allow a fluid to flow between the first and second tanks.

3. The battery pack of claim 1, wherein the cavity of the first and second tanks and the flow path of the third tank are isolated from each other.

4. The battery pack of claim 1, further comprising a heat conduction block between the cavity of the first and second tanks and the flow path of the third tank.

5. The battery pack of claim 4, wherein the heat conduction block is not provided with a space for storing a fluid.

6. The battery pack of claim 1, wherein an inlet for introducing the second cooling medium and an outlet for discharging the second cooling medium are-defined in the third tank.

7. The battery pack of claim 1, wherein an average flow speed of the first cooling medium is less than an average flow speed of the second cooling medium.

8. The battery pack of claim 1, wherein the first cooling medium has a heat capacity greater than a heat capacity of the second cooling medium.

9. The battery pack of claim 1, wherein the first and second tanks are connected to each other through a first bent portion and extend in different directions from the first bent portion to respectively face the terminal surface and the lateral surface of the battery cell.

10. The battery pack of claim 9, wherein the cavity extends through the first bent portion and fluidically connects the first and second tanks to each other.

11. The battery pack of claim 1, wherein the second and third tanks are connected to each other through a second bent portion and extend in different directions from the second bent portion to respectively face the lateral surface and the bottom surface of the battery cell.

12. The battery pack of claim 11, further comprising a heat conduction block between the cavity of the second tank and the flow path of the third tank, wherein the heat conduction block comprises the second bent portion and extends across the second bent portion.

13. The battery pack of claim 1, wherein the first tank is located in a region outside a pair of electrode terminals, the pair of electrode terminals including the electrode terminal of the battery cell.

14. The battery pack of claim 1, wherein the cavity has a width which is uniform in the first tank and is nonuniform in the second tank.

15. The battery pack of claim 14, wherein the width of the cavity gradually decreases from an upper position of the second tank which is relatively close to the first tank toward a lower position of the second tank which is relatively close to the third tank.

16. The battery pack of claim 15, wherein the second tank comprises an inner wall facing the lateral surface of the battery cell and an outer wall which is opposite the lateral surface of the battery cell, and
    a thickness of the second tank which is defined between the inner wall and the outer wall is constant from the upper position relatively close to the first tank to the lower position relatively close to the third tank.

17. The battery pack of claim 16, wherein a first thickness defined between the cavity and the inner wall is constant from the upper position relatively close to the first tank to the lower position relatively close to the third tank, and
    a second thickness defined between the cavity and the outer wall gradually increases from the upper position relatively close to the first tank to the lower position relatively close to the third tank.

18. The battery pack of claim 17, wherein the cavity of the second tank has a triangular cross-section with a hypotenuse which obliquely extends from a vertex located at the upper position relatively close to the first tank to a vertex located at the lower position relatively close to the third tank such that the width of the cavity gradually decreases from the upper position to the lower position.

19. The battery pack of claim 1, wherein the first to third tanks extend as one part.

* * * * *